United States Patent [19]

Schrörs et al.

[11] Patent Number: 4,877,331

[45] Date of Patent: Oct. 31, 1989

[54] APPARATUS FOR MEASURING THE TEMPERATURE OF THE SURFACE OF A ROTATING ROLL

[75] Inventors: Günter Schrörs, Tönisvorst; Bernhard Brendel, Grefrath; Werner Hartmann, Krefeld, all of Fed. Rep. of Germany

[73] Assignee: Eduard Küsters Maschinenfabrik GmbH & Co. KG, Krefeld, Fed. Rep. of Germany

[21] Appl. No.: 257,350

[22] Filed: Oct. 13, 1988

[30] Foreign Application Priority Data

Oct. 8, 1987 [DE] Fed. Rep. of Germany ....... 3734018

[51] Int. Cl.$^4$ .................... G01K 13/08; G01K 1/16
[52] U.S. Cl. ................................ 374/153; 374/121; 374/126; 250/338.1; 356/43; 136/213
[58] Field of Search ............... 374/153, 121, 126; 250/338.1; 356/43, 44, 45; 136/213

[56] References Cited

U.S. PATENT DOCUMENTS

| | | | |
|---|---|---|---|
| 4,091,673 | 5/1978 | Tamura et al. | 374/153 |
| 4,408,903 | 11/1983 | Baldasarri | 374/153 |
| 4,441,827 | 4/1984 | Coderre | 374/153 |
| 4,553,854 | 11/1985 | Yamada et al. | 374/129 |
| 4,586,372 | 5/1986 | Massen | 73/159 |

FOREIGN PATENT DOCUMENTS

| | | |
|---|---|---|
| 1498490 | 9/1969 | Fed. Rep. of Germany . |
| 1806637 | 5/1970 | Fed. Rep. of Germany . |
| 8020110 | 10/1980 | Fed. Rep. of Germany . |
| 61-96426 | 5/1986 | Japan ................... 374/121 |

Primary Examiner—William A. Cuchlinski, Jr.
Assistant Examiner—Diego F. F. Gutierrez
Attorney, Agent, or Firm—Kenyon & Kenyon

[57] ABSTRACT

A temperature measuring device for a rotating roll comprises a housing with guide rollers around which a belt is looped and held under tension by an idler roll. One boundary of the housing is arched concavely in accordance with typical roll diameters to enable the blet to run freely in this region outside the housing and press against a roll surface in a looping region to drive the belt as the roll rotates. The inner side of the belt facing away from the roll may be blackened and the energy radiated therefrom may be measured by a radiation pyrometer to determine the temperature of the roll.

21 Claims, 2 Drawing Sheets

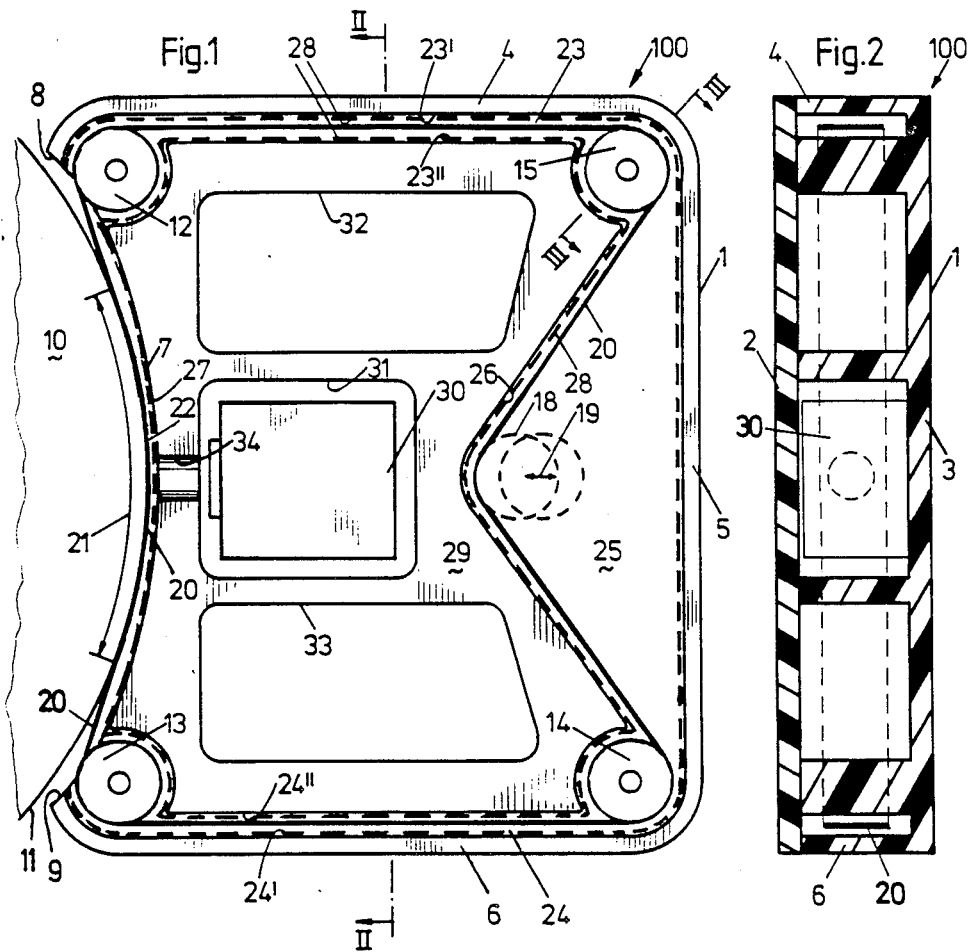
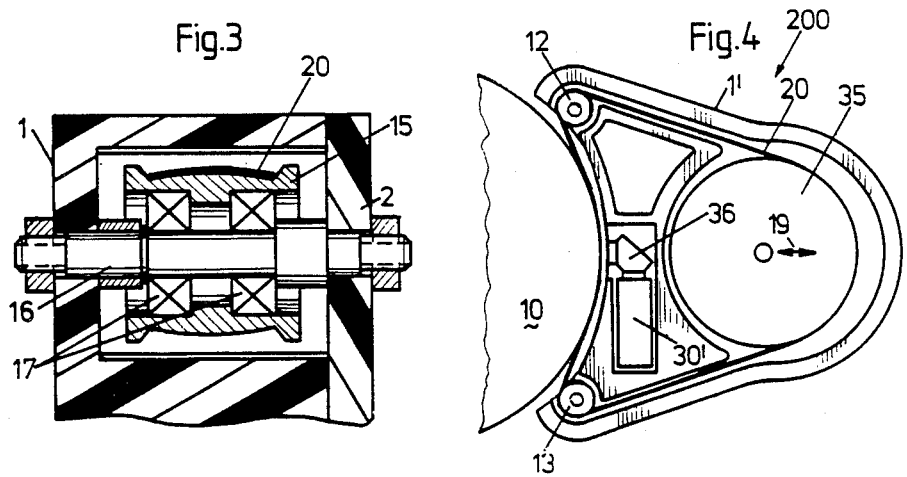

APPARATUS FOR MEASURING THE TEMPERATURE OF THE SURFACE OF A ROTATING ROLL

BACKGROUND OF THE INVENTION

The invention generally relates to roll apparatus for treating a web of material and more particularly to a temperature sensor for measuring the temperature of the outer rotating surface of the roll.

The exact determination of the temperature of roll surfaces in operation has been a longstanding problem in the paper, textile, and plastic industries. There are in principle several possibilities for temperature measurement. One possibility is to provide a suitable sensor that rotates with the roll and to derive the measured temperature values of the rotating roll through wiper contacts. Apart from the considerable expense, a disadvantage of this form of sensor lies in that only the temperature at a certain point can be picked up and, in particular, placing the sensor in the roll surface creates an inhomogeneity which in most cases is not acceptable because, for example, marks will appear on the paper web. Another possibility is to provide temperature measuring elements, fixedly disposed on the roll surface that make sliding or rolling contact with the roll surface. This type of sensor results in inaccurate temperature measurement, leads to early wear of the temperature measuring element and produces marks on the roll. Lastly, in another possibility, the temperature of roll surfaces can be determined with radiation pyrometers. This type of temperature measurement is currently practiced to a larger degree than the previously mentioned possibilities. Radiation pyrometers can sense temperatures without roll contact at any point on the roll and at relatively low cost, but are subject to imprecision if the emission factor of the roll surface changes in an uncontrolled manner. This can occur, for example, due to moisture influences of various kinds or because the roll tarnishes, as may be the case with use of highly heated rolls commonly used in the nonwoven textile and plastics industries.

In DE-OS No. 14 98 490 a temperature measuring device for running webs is disclosed that comprises, for example, a, tubular housing with a surface provided at the end disposed toward the fabric that forms with the web, for example, a wedge-shaped space that narrows in the running direction of the web. In the housing surface, openings are provided for passage of the air boundary layer, located directly at the web surface, to the temperature sensor contained inside the tubular housing. The temperature sensor is formed by a thermocouple. The air boundary layer, which is entrained by the web and has the same temperature as the web, is trapped in tee wedge-shaped space and conducted through the openings into the interior of the housing. In the housing interior, a relatively undisturbed measuring of the temperature can take place. This temperature measuring device would not be very suitable for use on roll surfaces because as the roll rotates the same area on the roll surface would run past the temperature measuring device and the boundary layer disturbed by the temperature measuring device could not reestablish itself for further temperature measurement in only one revolution of the roll.

In DE-PS No. 26 50 771 an apparatus is disclosed for measuring the temperature of a surface of a rotating roll having a temperature sensor directed against the roll and a belt disposed between the roll and the sensor that abuts against the roll in a looping region and is movable in a longitudinal direction in a plane perpendicular the axis of the roll. This apparatus is used for measuring the temperature of a heated melt-on roll in a melt fixing system for the melting of toner images on a support material. In this patent a cleaning belt, which is for wiping entrained toner off the roll surface, abuts against the roll. A temperature sensor in the form of a thermocouple formed by two metal belts butt-welded together abuts against the cleaning belt on the side away from the roll surface. The weld point is pressed against the cleaning belt and the roll surface by an elastic cushion. The lo cleaning belt is wound intermittently from a supply spool onto a take-up spool.

For rolls used in the paper, textile and plastics industries, i.e., rolls which are not used in copying devices, but serve to imprint and possibly to heat-treat wide fabric webs running over the rolls, a cleaning belt to be wound from a supply spool onto a take-up spool cannot be provided. If the temperature sensor were used without the cleaning belt, the thermocouple would slide directly over the roll surface and short-circuit the thermocouple. Also the thermocouple would o wear quickly and the problems caused by marks appearing on the roll surface would occur.

The invention is directed to the problem of providing an improved apparatus for measuring the temperature of a surface of a rotating roll used in paper, textile and plastic treating that can measure temperature accurately at relatively low cost without the occurrence of frictional wear on the apparatus and/or marks on the roll.

SUMMARY OF THE INVENTION

The invention solves this problem by providing an apparatus for measuring the temperature of a surface of a rotating roll comprising a roll rotatable about a longitudinal axis and including a surface having a temperature to be sensed, a temperature sensor comprising a radiation sensor directed toward the roll surface, and a belt disposed between the roll and the temperature sensor that abuts against the roll surface in a looping region to transmit heat from the roll to the temperature sensor. The belt is supported for endless revolution and revolves in a closed loop path such that its longitudinal axis lies in a plane perpendicular to the longitudinal axis of the roll. The temperature sensor measures heat radiated from the roll without contacting the roll and the belt.

The term "belt" is used in a broad sense and comprises any strip-type element of more or less great rigidity having a thickness that is small in relation to the belt width and much smaller in relation to the belt length. However, in contrast to the belts previously used in the prior art, the belt of the invention does not unwind from a supply reel, but rather is a closed loop that endlessly revolves and may be driven by the roll such that in the looping region it is in contact with the roll surface for heat-conduction and in the absence of relative velocity between the roll and belt, it is not in frictional contact. On the inner side of the belt disposed away from the roll surface, the heat absorbed by conduction at the roll surface contacting side is radiated off for reception and sensing by the temperature radiation sensor. Use of a radiation sensor is important to ensure that contact with the running belt surface is not required. Thus, the invention advantageously provides a temperature measuring device which is free of sliding friction and therefore leaves no marks on the roll and is at the same time independent of variations in the radiation properties of the roll surface because the heat is conducted to the belt by contact therewith and is transformed into radiation only on the inner surface of the belt.

For more accurate temperature measurement a high radiation yield is beneficial for sensitive response and accurate temperature measurement through radiation. Thus, the emission factor on the inner belt side facing the temperature radiation sensor may be greater than 0.5. This can be achieved by providing this side of the belt with a black surface facing toward the temperature radiation sensor.

The belt may be formed from a plastic material that may be fabric-reinforced or may be formed by a fabric that may comprise carbon fibers. Although, the heat conductivity of a plastic belt is not particularly high, the radiation properties of the blackened inner side do not vary substantially upon changes in temperature. Since the belt contacts the same surface area of the roll for a certain time period that is great enough to enable the heat to be conducted to the blackened side, the heat conductivity of a plastic belt does not adversely affect operation. The inertia of the apparatus of the invention is, at any rate, perfectly comparable to the previous apparatuses for measuring the surface temperature of rolls and is far smaller than the very inaccurate apparatus for the determination of the roll temperature via the temperature of the heating medium.

Although a separate drive mechanism for the belt may be provided, it is preferred to provide a belt that is driven by contact with the roll. The belt has a mass that is small enough to enable the belt to be very quickly accelerated to the circumferential speed of the roll.

The belt is supported for revolution in a closed loop path that guides the belt around guide rollers. The guiding arrangement may include means for tensioning the belt such that the belt abuts the roll surface with a certain tension in the looping region to ensure satisfactory contact for belt drive and heat-transfer purposes. The tensioning means may comprise a movable idler, i.e., a tightening roller, for the belt to compensate for belt length variations and maintain the tension.

Another important feature of the invention is provision of a substantially closed housing. This ensures that the radiant inner side of the belt and the temperature radiation sensor are insulated from outside environmental influences. Provision of narrow passages defining at least part of the belt's path of revolution avoids temperature losses, i.e., by guiding the belt through narrow passages in the housing, the air volume that could be influenced by the belt is reduced.

The accuracy of the temperature measurement may be increased when the narrow passages are formed by wall portions of the housing having a reflective surface. This prevents the belt from losing too much temperature by heat radiation during revolution in its closed loop path. The reflecting surface may be obtained by simply covering the wall areas with reflective foil. Alternative embodiments of the housing are disclosed.

The temperature radiation sensor may be disposed in the center of the housing such that the radiation incident upon the sensor originates from the center of the looping region at a point approximately radial to the roll. The term "temperature radiation sensor" includes any type of sensor that responds to radiation to measure temperature. It is preferred to use a radiation pyrometer that is one of several commercially available models generally in use.

BRIEF DESCRIPTION OF THE DRAWINGS

FIG. 1 shows a front view of an apparatus constructed according to the principles of the invention in which the cover of the temperature sensing housing has been removed.

FIG. 2 shows a transverse section along line II—II in FIG. 1;

FIG. 3 shows a partial transverse section along line III—III in FIG. 1;

FIG. 4 shows a view corresponding to FIG. 1, on a smaller scale, of another embodiment of a temperature sensing apparatus constructed according to the invention.

DETAILED DESCRIPTION

Figure 5:
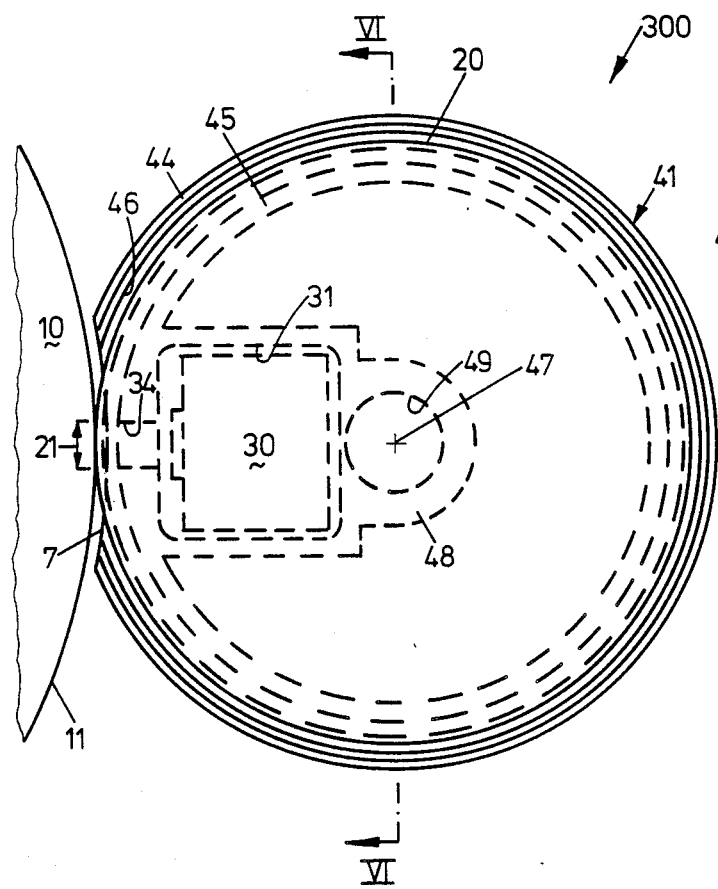
FIG. 5 shows a view corresponding to FIG. 1 of yet another embodiment of the invention.

The temperature measuring apparatus designated at 100 in FIGS. 1 and 2 comprises a plastic housing 1 of substantially rectangular plan that is formed as a flat box and is closed by a plate type cover 2 not shown in FIG. 1. The housing 1 comprises a closed bottom area 3 and according to FIG. 1 an upper sidewall 4, a right sidewall 5, and a lower sidewall 6. As shown on the left side of FIG. 1 a left sidewall is not provided and the housing 1 is defined by an arc 7 whose radius conforms with the radius of the commonly used rolls for the treatment of webs of material. The sidewalls 4 and 6 terminate at end faces 8, 9 situated on the arc. The roll surface having a temperature is to be measured is designated at 10.

In the corners of the substantially rectangular housing 1, guide rollers 12, 13, 14, 15 are arranged with their longitudinal axes running parallel to the axis of roll 10. The guide rollers are rotatably supported by ball bearings 17 provided on roll necks 16 that traverse the housing, as can be seen in the example guide roller 15 illustrated in FIG. 3. Looped around the four guide rollers 12, 13, 14, 15 is an endlessly revolving belt 20 that is held in tension by an idler, i.e., another guide roll 18, disposed between the guide rollers 14, 15 and movable perpendicular to the longitudinal axis of the roll in the direction shown by arrow 19.

In this embodiment, belt 20 may comprise a fabric-reinforced, but otherwise solid belt of polytetrafluoroethylene that is provided on its inner side with a black surface 22. Normally, belt 20 runs straight down between the guide rollers 12 and 13 at the open side of housing 1. When the temperature measuring device 100 of FIG. 1 is directed against the roll 10 from the right, the outer side of belt 20 lays against the outer roll surface 11 and hugs surface 11 over a looping region 21 By this bearing-like contact the belt becomes engaged in the direction of rotation of roll 10 to drive the belt and after a short acceleration time it abuts against the roll surface 11 without slippage and friction. The belt revolves in a closed loop path such that the lengthwise or longitudinal axis of the belt lies in a plane that is perpendicular to the longitudinal axis of the roll.

In the looping region 21 heat is transferred from the roll surface 11 to belt 20 by conduction. This heat is radiated off onto the blackened side 22 of belt 20, which during revolution is the inner side, and is picked up by a radiation pyrometer 30 placed approximately in the center of the looping region 21. The objective lens of pyrometer 30 is radially directed with respect to roll 10 against the black surface 22 of belt 20.

In the illustrated embodiment, the housing 1 may comprise a plate-type plastic part having a thickness such that the guide rollers 12, 13, 14, 15, 18 can be accommodated within the housing in the manner evident from FIG. 3. Narrow passages 23, 24 are cut out of the thickness of the plate-type plastic part adjacent to the sidewalls 4, 6, such that the belt 20 passes through the passages. On sidewall 5 an essentially triangular chamber 25 is formed to provide the idler 18 with enough space when being flexibly displaced to adjust the tension of belt 20. The walls 23', 23" and 24', 24" adjacent to belt 20 that define the passages 23 and 24, the wall 26 adjacent to belt 20 in the triangular chamber 25, and the wall 27 of housing 1 adjacent to belt 20 on the roll contact side may all be made reflective for optimum heat radiation by provision of a reflection foil 28, shown by broken lines, that may be glued onto the aforementioned walls. The feeding of belt 20 through the passages 23, 24, in conjunction with the reflecting design of the adjacent walls ensures that the belt 20 loses as little heat as possible during its closed path revolution.

In the inner region 29 the full thickness of the plate-type plastic part forming the housing 1 is preserved except for provision of a chamber 31 for housing the radiation pyrometer 30, and two additional chambers 32, 33 that are machined out for the purpose of saving material. Leading from the cutout 31 for the radiation pyrometer 30, a continuous passage 34 to the outside is formed through which the heat radiation emanating from the black side 22 of belt 20 is conducted to the objective lens of the radiation pyrometer 30.

In the temperature measuring device 200 of FIG. 4, functionally similar parts are designated with the same reference numbers used in conjunction with the FIGS. 1–3 embodiment. Device 200 mainly differs from the temperature measuring device 100 in that instead of the guide rollers 14, 15 and idler 18 a single larger roller 35 is provided which is displaceable in the direction of arrow 19 in order to tighten belt 20. Accordingly, housing 1' has a more triangular plan. The radiation pyrometer 30' is provided with a 90° deflector 36 such that pyrometer 30' can extend sideways and the construction according to FIG. 4 does not become as cantilevered to the right as the FIGS. 1–3 embodiment. The remaining features and operation of the FIG. 4 embodiment correspond to those disclosed in the temperature measuring device 100.

Figure 6:
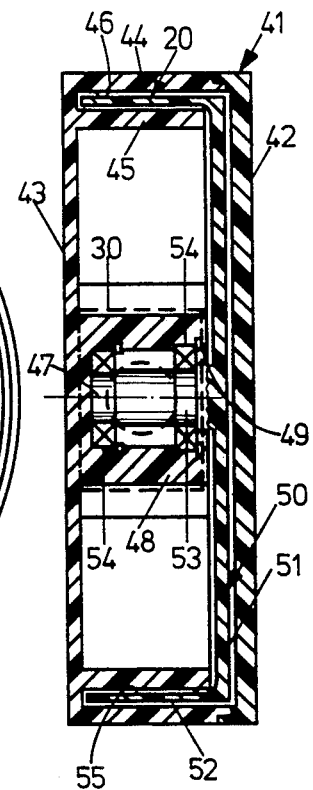
FIG. 6 shows a transverse section along line VI—VI in FIG. 5.

Similarly, in the temperature measuring device 300 of FIGS. 5 and 6, functionally similar parts are designated with the same reference numbers as in the FIGS. 1–3 embodiment. In the FIGS. 5 and 6 embodiment the housing 41 is not box-like, but rather is cylindrical and formed as a receptacle that has a bottom part 43 and a cover 42 (see FIG. 6). Formed in the bottom part 43 by an inner wall 45 extending up from the bottom parallel to the peripheral wall 44 is a cylindrical channel 46 that opens to the outside on the left side in FIG. 5. At that point the peripheral wall 44 is removed to form a bottom 7 inwardly arched to conform with the periphery of roll 10. Rising from the bottom of the center of the bottom part 43 is a projection 48 having a cylindrical stepped bore 49 which extends along the axis longitudinal 47 of the cylindrical housing 41. Mounted in bore 49 is a flat drum designated 50 as a whole that is formed by a round disk 51, which lies opposite the bottom of the bottom part 43. From the edge of disk 51 a thin-walled cylindrical peripheral wall 52 is received in the cylindrical channel 46 and extends almost to the bottom of the bottom part 43. In the center of the flat drum 50 a bearing neck 53 rotatably supports drum 50 by means of ball bearings 54 provided in the bore 49 of the projection.

The peripheral wall 52 of the flat drum 50 forms a member that is analogous to the previously described "belt" 20. In a narrow contact region 21 drum 50 abuts against the rotating roll 10, heats up by the contact therebetween, and emits a radially inwardly directed temperature radiation which is conducted through a radial channel 34 to a radiation pyrometer 30. Pyrometer 30 is accommodated within the inside the bottom part 43 in an appropriate chamber 31 such that the temperature of the roll surface 11 can be measured without contact with the sensor and without friction.

To obtain as high as possible an emission factor for the temperature radiation, the inner periphery 55 of the peripheral wall 52, or respectively, of the belt 20 may be blackened. The inner circumference 55 of the flat drum 50 is not touched during revolution thereby ensuring that its radiation properties do not change in the course of operation.

As with the other embodiments, in the temperature measuring apparatus 300, the walls of the cylindrical channel 46 in which the peripheral wall 52 of the flat drum 50 is received, may be made to reflect thermal radiation, for example, by covering them with a reflective foil.

What is claimed is:

1. Apparatus for measuring the temperature of a surface of a rotating roll comprising:
   (a) a roll rotatable about a longitudinal axis and including a surface having a temperature to be sensed;
   (b) a temperature sensor comprising a radiation sensor directed toward the roll surface; and
   (c) a belt disposed between the roll and the temperature sensor that abuts against the roll surface in a looping region to transmit heat from the roll to the temperature sensor, said belt being supported for endless revolution and revolving in a closed loop path such that its longitudinal axis lies in a plane perpendicular to the longitudinal axis of the roll and wherein said temperature sensor measures heat radiated from the roll without contacting the roll and the belt 2. Apparatus according to claim 1 wherein said belt has a first side facing the temperature sensor that has an emission factor greater than 0.5.

3. Apparatus according to claim 2 wherein said first side comprises a black surface.

4. Apparatus according to claim 3 wherein the belt is formed from a plastic material.

5. Apparatus according to claim 4 wherein the belt is fabric-reinforced.

6. Apparatus according to claim 1 wherein the belt is formed from a fabric material.

7. Apparatus according to claim 6 wherein the belt comprises carbon fibers.

8. Apparatus according to claim 1 wherein the belt is driven in said closed loop path by contact with the rotatable roll.

9. Apparatus according to claim 1 further comprising guide rollers each having a rotation axis parallel to the longitudinal axis of tee roll wherein said belt revolves around the rollers.

10. Apparatus according to claim 9 wherein the guide rollers comprise two guide rollers provided at the ends of the looping region adjacent to, but not contacting the roll surface and further comprising means for tensioning the belt between said two guide rollers whereby the belt abuts against the roll surface in the looping region under tension.

11. Apparatus according to claim 10 wherein said tensioning means comprises a flexibly displaceable idler roll.

12. Apparatus according to claim 1 further comprising a housing in which the belt is guided, said housing being substantially closed except in the looping region.

13. Apparatus according to claim 12 wherein said closed loop path is defined, at least in part, by narrow passages formed within the housing.

14. Apparatus according to claim 13 wherein said narrow passages are formed by wall portions within the housing with at least one wall portion having a reflective surface.

15. Apparatus according to claim 14 wherein said reflective surface comprises a reflective foil covering said at least on wall portion.

16. Apparatus according to claim 12 wherein the housing is formed as an essentially rectangular flat box supporting guide rollers for the belt.

17. Apparatus according to claim 12 wherein the housing comprises a cylinder containing a flat drum rotating about an axis coaxial with the longitudinal axis of the cylinder, said drum having a cylindrical peripheral wall defining the belt.

18. Apparatus according to claim 17 wherein said cylinder contains a central upstanding projection having a bearing rotatably supporting the drum.

19. Apparatus according to claim 12 wherein the temperature sensor is arranged in the center region of the housing such that the radiation incident upon the sensor originates from the center of the looping region at a point radial to the roll.

20. Apparatus according to claim 17 wherein the temperature sensor is arranged in the center region of the housing such that the radiation incident upon the sensor originates from the center of the looping region at a point radial to the roll.

21. Apparatus according to claim 1 wherein the temperature sensor comprises a radiation pyrometer.

* * * * *

UNITED STATES PATENT AND TRADEMARK OFFICE
CERTIFICATE OF CORRECTION

PATENT NO. : 4,877,331

DATED : October 31, 1989

INVENTOR(S) : Günter Schrörs et al.

It is certified that error appears in the above-identified patent and that said Letters Patent is hereby corrected as shown below:

Title page:

In the abstract, line 5, change "...enable the blet..."
to read --...enable the belt...--

In Column 1, line 54, change "...trapped in tee..."
to read --...trapped in the...--

Column 2, line 2, change "...perpendicular the axis..."
to read --...perpendicular to the axis...--

Column 2, line 12, change "The lo cleaning belt..."
to read --The cleaning belt...--

Column 3, line 68, change "...to measure temperation."
to read --...to measure temperature.--

Column 4, line 35, change "...temperature is to..."
to read --...temperature to...--

Column 4, line 55, change "...of belt 20 lays..."
to read --...of belt 20 lies...--

UNITED STATES PATENT AND TRADEMARK OFFICE
CERTIFICATE OF CORRECTION

PATENT NO. : 4,877,331

DATED : October 31, 1989

INVENTOR(S) : Günter Schrörs et al.

It is certified that error appears in the above-identified patent and that said Letters Patent is hereby corrected as shown below:

```
In Column 4, line 56, change "...region 21  By..."
    to read --...region 21.  By...--

Column 5, line 66, change "...axis longitudinal 47..."
   to read --...longitudinal axis 47...--

Column 6,  line 15, change "...inside the bottom..."
   to read --...inside of the bottom...--

Column 7, claim 9, line 1, change "...of tee roll..."
   to read --...of the roll...--

Column 8, claim 15, line 3, change "...at least on wall...
   to read --...at least one wall...--
```

Signed and Sealed this

Twentieth Day of August, 1991

*Attest:*

HARRY F. MANBECK, JR.

*Attesting Officer*    Commissioner of Patents and Trademarks